Feb. 8, 1955
C. A. TEA
2,701,713
REAR WHEEL SUSPENSION
Filed July 21, 1953
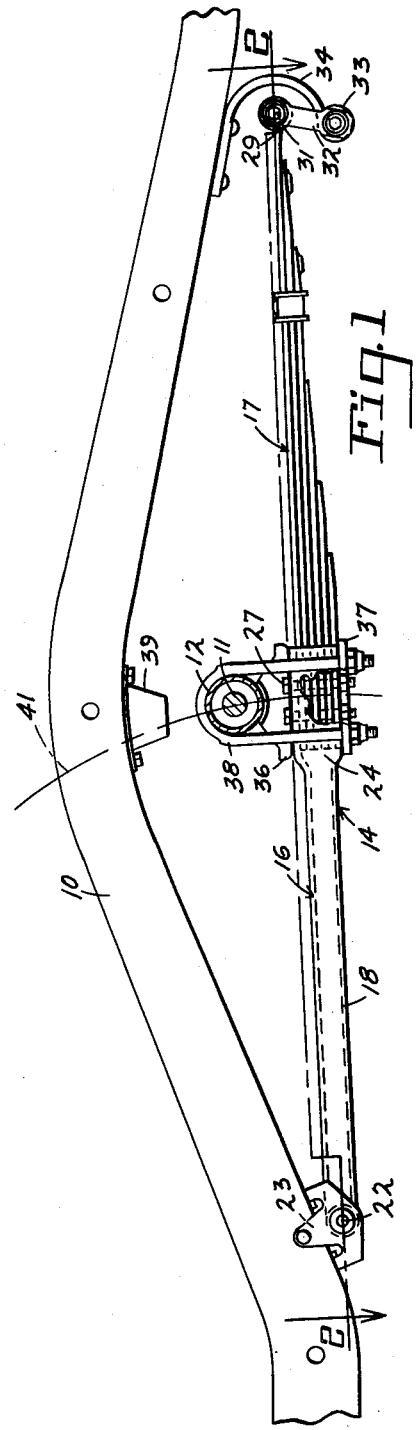
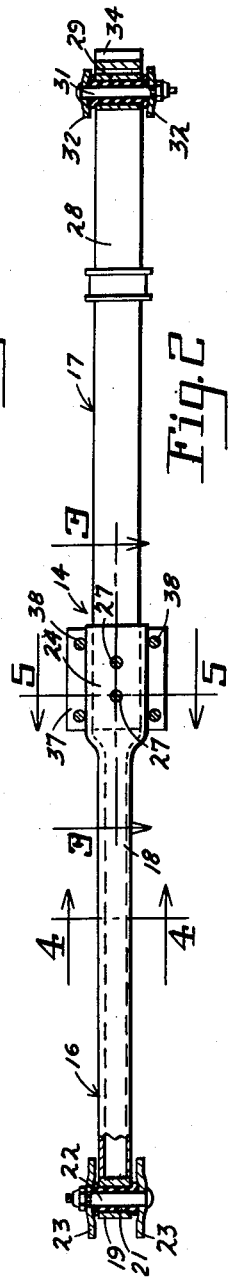
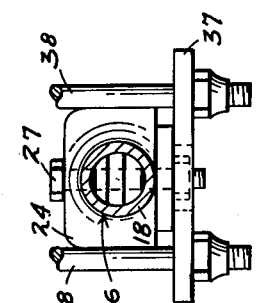
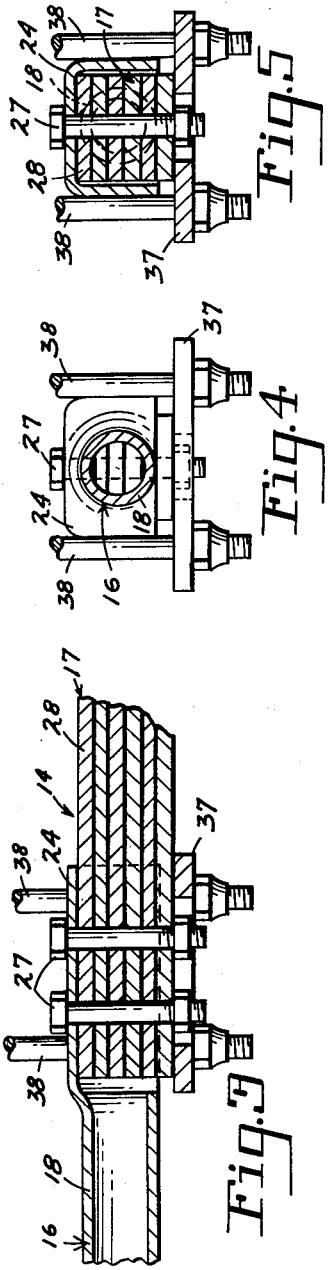
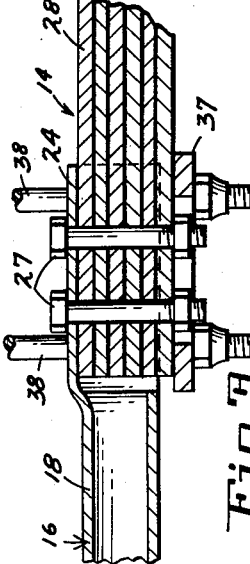
INVENTOR.
CLARK A. TEA.
BY E. C. McRae
J. R. Faulkner
T. H. Oster ATTORNEYS

United States Patent Office 2,701,713
Patented Feb. 8, 1955

2,701,713

REAR WHEEL SUSPENSION

Clark A. Tea, Detroit, Mich., assignor to Ford Motor Company, Dearborn, Mich., a corporation of Delaware Application July 21, 1953, Serial No. 369,287

1 Claim. (Cl. 267—19)

This invention relates generally to a rear wheel suspension for a motor vehicle, and has particular reference to an improved leaf spring suspension for the rear driving wheels of a motor vehicle.

The rear wheel suspension of the present invention is a modification of the well known Hotchkiss suspension. The Hotchkiss drive utilizes semielliptic leaf springs which not only cushion road shocks but also take the rear axle torque and the propelling and retarding forces between the vehicle and the ground. The present invention replaces each semielliptic leaf spring with a torque arm and a cantilever spring secured together to form a unit. The torque arm forms the forward portion of the unit and is pivotally secured at its forward end to the vehicle frame and at its rearward end is attached to the rear axle, while the cantilever leaf spring forms the rearward portion of the unit and extends from the axle to the usual rear spring shackle. With this construction, the cantilever spring cushions road shocks but is not required to take any of the driving forces. The torque arm, on the other hand, takes not only the rear axle torque but also the driving and braking forces, and also guides the rear axle in a predetermined path. Spring windup is thus eliminated, and traction between the road wheels and the road is improved during quick starts and stops. In addition, the suspension provides an anti-lift feature during brake applications, and reduces axle hop.

Other objects and advantages of this invention will be made more apparent as this description proceeds, particularly when considered in connection with the accompanying drawings, wherein:

Figure 1 is a side elevational view of the rearward portion of a motor vehicle chassis incorporating the rear suspension of the present invention.

Figure 2 is a horizontal cross-sectional view taken on line 2—2 of Figure 1.

Figure 3 is a vertical cross-sectional view taken on the line 3—3 of Figure 2.

Figures 4 and 5 are enlarged transverse cross-sectional views taken on the lines 4—4 and 5—5 of Figure 3.

Referring now to the drawings, the reference character 10 indicates a side frame rail of the vehicle chassis, and 11 an axle shaft therefor contained within the axle tube 12 for driving the rear road wheel (not shown). The axle tube 12 is adapted to be suspended from the frame 10 by means of a suspension unit 14.

The suspension unit 14 comprises a longitudinally extending tubular torque arm 16 connected at its rearward end to a longitudinally extending cantilever leaf spring 17. The body portion 18 of the torque arm 16 is tubular in cross-section and at its forward end is welded to a transversely extending sleeve 19 forming part of a pivotal connection between the torque arm and the frame. A rubber bushing 21 is contained within the sleeve 19 and receives a pivot bolt 22 the opposite ends of which extend through the bifurcated side plates 23 of a supporting bracket welded to the side frame rail 10. It will be seen that the torque arm is thus supported at its forward end for pivotal movement about a transverse horizontal axis, and is insulated from the frame for noise and vibration suppression.

At its rearward end the torque arm 16 is formed with an integral downwardly facing U-shaped extension 24. The channel-shaped extension 24 of the torque arm 16 is open at its rearward end and receives the forward end of the cantilever leaf spring 17. The upper wall of the U-shaped extension 24 of the torque arm and the leaves of the cantilever spring are provided with aligned openings for receiving a pair of bolts 27 securing the torque arm and cantilever spring together to form a suspension unit.

At its rearward end the main upper leaf 28 of the cantilever spring 17 is formed with an integral spring eye 29 pivotally connected by means of a shackle bolt 31 and a spring shackle 32 to the eye 33 formed at the lower end of the spring hanger 34. The upper end of the hanger 34 is secured to the frame side rail 10.

It will be seen that the suspension unit comprising the interconnected torque arm 16 and the cantilever spring 17 is pivotally mounted at its forward end for pivotal movement about the transverse horizontal axis of the pivot bolt 22 so that the rearward or U-shaped end 24 of the torque arm swings in an arc about this axis. The cantilever spring 17 is of course flexible in a vertical direction and the shackle 32 at the rearward end thereof accommodates the flexing movement of the spring as well as the longitudinal movement thereof as the torque arm swings in a vertical direction about the pivot bolt 22.

The rearward or U-shaped end 24 of the torque arm 16 is rigidly connected to the rear axle tube 12 by means of upper and lower spring plates 36 and 37 and conventional U-shaped bolts 38 which encircle the axle tube and extend through the spring plates to clamp the latter to the rearward end of the torque arm 16 of the suspension unit. A conventional axle bumper 39 is secured to the lower flange of the frame side rail 10 in position to contact the axle tube during excessive axle movement.

With the foregoing construction it will be seen that the axle 11 is required to move in an arcuate path indicated by the line 41 in Figure 1, about the axis formed by the pivot bolt 22 interconnecting the forward end of the torque arm 16 to the vehicle frame. The torque arm 16 takes the rear axle torque as well as the propelling and retarding forces between the vehicle and the road, thus relieving the spring of such loads. The cantilever spring 17, consequently, is required only to carry the vertical loads and to provide for cushioning of road shocks. In addition, the torque arm 16 serves to reduce the lift of the rear end of the vehicle on sudden brake applications since the braking torque is received by the torque arm 16 and applies a downward force to the frame 10 at the pivot bolt 22. Axle hop is also reduced, and road traction during quick starts and stops is enhanced.

The diameter and/or the thickness of the tubular torque arm 16 can be varied to provide the required amount of roll stiffness for good handling characteristics. In addition the roll resistance can be altered by varying the size and the hardness of the rubber bushing 21 at the forward end of the torque arm.

It will be understood that the invention is not to be limited to the exact construction shown and described, but that various changes and modifications may be made without departing from the spirit and scope of the invention, as defined in the appended claim.

What is claimed is:

A rear wheel suspension for a motor vehicle having a frame and a rear axle, comprising a rigid tubular torque arm having a transversely extending sleeve provided at its forward end, a bracket depending from said frame adjacent the forward end of said torque arm, a pivot bolt extending through said bracket and the sleeve at the forward end of said torque arm to pivotally connect said torque arm to said frame for pivotal movement about a transverse horizontally extending axis, a downwardly facing channel-shaped end extension formed integrally at the rearward end of said tubular torque arm, said extension having an open rearward end, a cantilever leaf spring having a main spring leaf and a plurality of adjacent auxiliary spring leaves all having their forward ends projecting through the open rearward end of the channel-shaped end portion of the torque arm and received within and embraced by said downwardly facing channel section, vertically aligned openings through the forward ends of said spring leaves and the upper wall of the channel-shaped end portion of the torque arm, bolts extending through said openings to secure said cantilever leaf spring to said torque arm, a spring shackle pivotally connecting the rearward end of said main spring leaf to the rearward portion of the vehicle frame, upper and lower spring plates on opposite sides of the rear end portion of said torque arm, the upper spring plate supporting said rear axle, and U-shaped bolts clamping said axle and axle plates to the rearward end portion of said torque arm to restrain movement of said rear axle to an arc about the horizontal transverse axis interconnecting the forward end of the torque arm to the vehicle frame.

References Cited in the file of this patent

UNITED STATES PATENTS

| | | |
|---|---|---|
| 1,174,313 | Girl | Mar. 7, 1916 |
| 1,242,574 | May | Oct. 9, 1917 |
| 1,623,422 | Lovejoy | Apr. 5, 1927 |
| 2,213,690 | Caldwell | Sept. 3, 1940 |
| 2,467,548 | Bradley | Apr. 19, 1949 |

FOREIGN PATENTS

| | | |
|---|---|---|
| 618,594 | Great Britain | Feb. 24, 1949 |